(12) United States Patent
Lee et al.

(10) Patent No.: US 8,985,994 B2
(45) Date of Patent: Mar. 24, 2015

(54) PATTERNING APPARATUS

(75) Inventors: Nam Seok Lee, Seoul (KR); Seung Hee Nam, Paju-si (KR); Shin Bok Lee, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 255 days.

(21) Appl. No.: 12/960,112

(22) Filed: Dec. 3, 2010

(65) Prior Publication Data

US 2011/0142979 A1 Jun. 16, 2011

(30) Foreign Application Priority Data

Dec. 11, 2009 (KR) ........................ 10-2009-0123583

(51) Int. Cl.
*B29C 59/04* (2006.01)
*B29C 55/20* (2006.01)

(52) U.S. Cl.
CPC ................. *B29C 59/04* (2013.01); *B29C 55/20* (2013.01)
USPC .......................................... 425/385; 264/293

(58) Field of Classification Search
CPC .......... B29C 59/04; B29C 55/00; B29C 55/20
USPC .......................................... 264/293; 425/385
See application file for complete search history.

(56) References Cited

U.S. PATENT DOCUMENTS

| | | | | | |
|---|---|---|---|---|---|
| 2,506,378 | A | * | 5/1950 | Miller | 425/265 |
| 3,466,706 | A | * | 9/1969 | Asano | 425/384 |
| 4,861,406 | A | * | 8/1989 | Baker et al. | 156/230 |
| 5,932,150 | A | * | 8/1999 | Lacey | 264/1.34 |
| 5,961,762 | A | * | 10/1999 | Zelinka et al. | 156/164 |
| 6,847,433 | B2 | * | 1/2005 | White et al. | 355/72 |
| 2004/0150135 | A1 | * | 8/2004 | Hennessey et al. | 264/293 |
| 2005/0062204 | A1 | * | 3/2005 | Nakashima | 264/500 |
| 2006/0082022 | A1 | * | 4/2006 | Denker et al. | 264/290.2 |
| 2007/0224717 | A1 | * | 9/2007 | Lee | 438/30 |
| 2009/0243153 | A1 | * | 10/2009 | Sreenivasan et al. | 264/293 |
| 2010/0189839 | A1 | * | 7/2010 | Sano et al. | 425/174.4 |

FOREIGN PATENT DOCUMENTS

WO    WO 2009011215 A1 *  1/2009 ............. B29C 59/02

* cited by examiner

*Primary Examiner* — Alison Hindenlang
(74) *Attorney, Agent, or Firm* — McKenna Long & Aldridge LLP

(57) ABSTRACT

A patterning apparatus includes a stage arranged under a flexible substrate, a plurality of correction units arranged closely to the stage, attached to the flexible substrate, and configured to apply a tension force to the flexible substrate, and a pattern forming unit configured to form a pattern on the flexible substrate. The patterning apparatus corrects distortion of the flexible substrate by using the correction units.

4 Claims, 5 Drawing Sheets

PATTERNING APPARATUS

CROSS-REFERENCE TO RELATED APPLICATION

This application claims priority under 35 U.S.C. 119 to Korean Patent Application No. 10-2009-0123583, filed on Dec. 11, 2009, which is hereby incorporated by reference in its entirety.

BACKGROUND

1. Field of the Disclosure

This disclosure relates to a patterning apparatus.

2. Description of the Related Art

In the modern information society, a demand on large, flat, and multifunctional displays increases in the field of a video industry. Also, a portable and light display capable of freely recording or exchanging information anytime is needed.

A glass substrate used for a flat display is formed to have a predetermined thickness and may be easily broken due to the properties of glass. Accordingly, an additional protection window is needed for portable displays or large displays. Also, the glass substrate is difficult to be bent.

Thus, to overcome the above difficulty of the glass substrate, that is, not easily being bent, a flexible substrate having properties of being unbreakable and being easily bent is used. Accordingly, technologies about ultra light, easy-to-carry, and flexible display devices as a substrate having the above properties are under development. The flexible display device is economical, very durable, and freely installed on a curved surface.

To embody the flexible display device, a flexible substrate such as plastic or metal foil is used. However, since the flexible substrate is flexible that is different properties of a glass substrate having a hard surface of a display device, the flexible substrate may be difficult to satisfy adaptability to a process.

In other words, when a pattern, for example, a thin film transistor having a deposition structure or a plurality of lines, is formed on the flexible substrate, the property of being flexible may make it difficult to align the pattern. Thus, technologies to fix the flexible substrate using a fixing apparatus to facilitate transferring and processing of the flexible substrate have been suggested.

BRIEF SUMMARY

Accordingly, the present embodiments are directed to a patterning apparatus that substantially obviates one or more of problems due to the limitations and disadvantages of the related art.

An object of the present disclosure is to provide a patterning apparatus which may correct a distorted flexible substrate and precisely form a desired pattern.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a patterning apparatus includes a stage disposed under a flexible substrate, a plurality of correction units being adjacent to the stage, attached to the flexible substrate, and applying a tension force to the flexible substrate, and a pattern forming unit forming a pattern on the flexible substrate.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
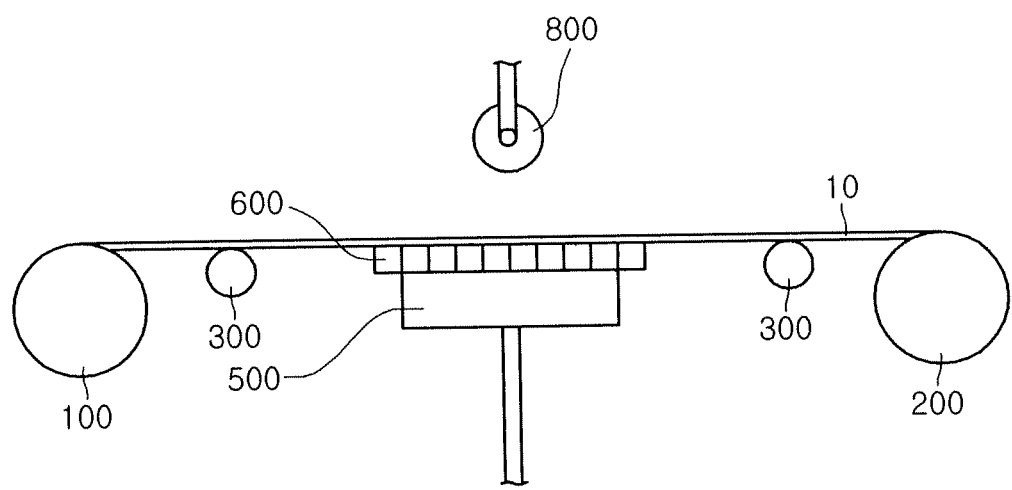
FIG. 1 illustrates a roll-to-roll system according to an embodiment of the present disclosure.

Reference will now be made in detail to the embodiments of the present disclosure, examples of which are illustrated in the accompanying drawings. In this disclosure, it will be understood that when an element, such as a substrate, a portion, a stage, a roller, or a pattern, is referred to as being formed "on" or "under" another element in the embodiments, it may be directly on or under the other element, or intervening elements (indirectly) may be present. The term "on" or "under" of an element will be determined based on the drawings. In the drawings, the sides of elements can be exaggerated for clarity, but they do not mean the practical sizes of elements.

Figure 2:
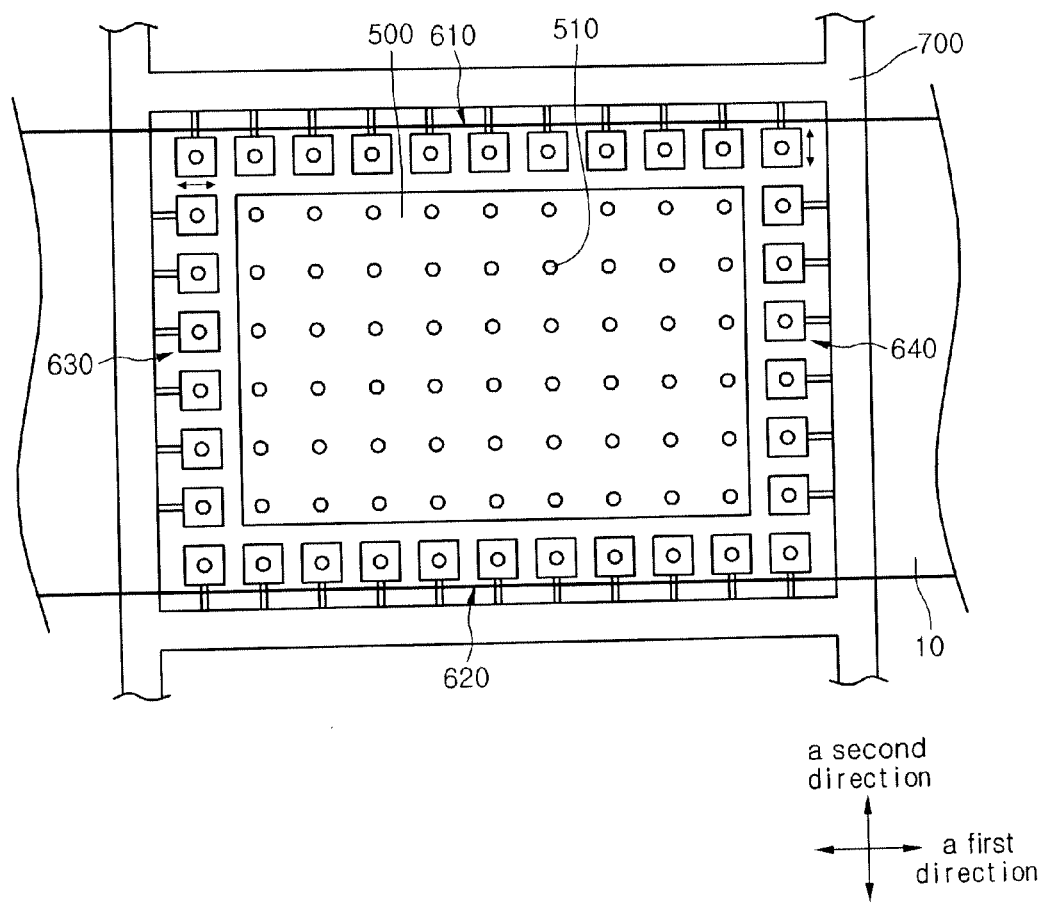
FIG. 2 is a plan view illustrating a part of the roll-to-roll system of FIG. 1.
Figure 3:
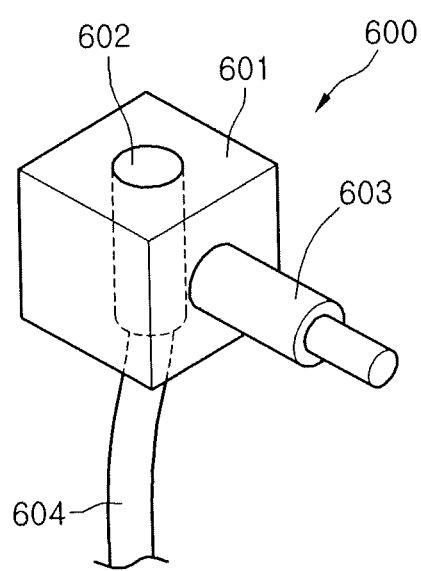
FIG. 3 is a perspective view illustrating a correction unit.

FIG. 1 illustrates a roll-to-roll system according to an embodiment of the present disclosure. FIG. 2 is a plan view illustrating a part of the roll-to-roll system of FIG. 1. FIG. 3 is a perspective view illustrating a correction unit.

Referring to FIGS. 1 through 3, a roll-to-roll system according to the present embodiment includes an unwinding roller 100, a winding roller 200, a transfer roller 300, a stage 500, a plurality of correction units 600, a support 700, and a printing roller 800. The unwinding roller 100 releases a flexible substrate 10. That is, the flexible substrate 10 is wound around the unwinding roller 100 and then released from the unwinding roller 100 by the rotation of the unwinding roller 100.

The winding roller 200 winds the flexible substrate 10. That is, the flexible substrate 10 where a pattern is formed winds around the winding roller 200 by the rotation of the winding roller 200. The flexible substrate 10 is moved from the unwinding roller 100 to the winding roller 200. That is, the flexible substrate 10 is moved in a first direction. The first direction is a direction in which the flexible substrate 10 is released and wound.

The transfer roller 300 transfers the flexible substrate 10 in form of a flat panel. That is, the transfer roller 300 transfers the flexible substrate 10 from the unwinding roller 100 to the printing roller 800. Also, the transfer roller 300 transfers the flexible substrate 10 from the printing roller 800 to the winding roller 200.

The stage 500 is disposed under the printing roller 800 and the flexible substrate 10. The stage 500 supports the flexible substrate 10. In particular, the stage 500 maintains the flat panel shape of the flexible substrate 10.

The stage 500 has a flat upper surface on which the flexible substrate 10 is placed. A plurality of first vacuum holes 510 are formed on the upper surface of the stage 500 and separated from each other at a constant interval. The stage 500 fixes the flexible substrate 10 by the suction force of the first vacuum holes 510. The upper surface of the stage 500 may adhere to or be separated from a lower surface of the flexible substrate 10. That is, the stage 500 is a vacuum chuck for fixing the flexible substrate 10.

The correction units 600 are disposed beside the stage 500. The correction units 600 surround the stage 500. The correction units 600 are disposed in a row around the stage 500. The correction units 600 are disposed under the flexible substrate 10. The correction units 600 adhere to the lower surface of the flexible substrate 10. In detail, the correction units 600 may adhere to or be separated from the lower surface of the flexible substrate 10.

The correction units 600 apply a tension force to the flexible substrate 10, in detail, in a horizontal direction. The correction units 600 may apply tension forces of different strengths to the flexible substrate 10. Alternatively, the correction units 600 may apply the same tension force to flexible substrate 10.

Referring to FIG. 3, each of the correction units 600 includes a body 601, a second vacuum hole 602, and a servo motor 603. The body 601 is disposed on the lower surface of the flexible substrate 10 to be capable of adhering to or being separated from the lower surface of the flexible substrate 10. The body 601 may have elasticity and, for example, rubber based resin or polyurethane based resin may be used as a material for the body 601.

The second vacuum hole 602 is formed in the body 601 and provides a vacuum pressure to the flexible substrate 10. The second vacuum hole 602 provides a vacuum pressure to the lower surface of the flexible substrate 10 by a vacuum pump (not shown) connected via a pipe 604. The body 601 is sucked and adheres to the flexible substrate 10 by the vacuum pressure through the second vacuum hole 602.

The servo motor 603 is connected to the body 601 and drives the body 601. That is, the servo motor 603 moves the body 601 in a horizontal direction. The body 601 is driven by the servo motor 603 and a tension force is applied to the flexible substrate 10.

The servo motor 603 is fixed to the support 700. Also, the servo motor 603 may receive a driving signal through a driving circuit arranged at the support 700.

The correction units 600 include first correction units 610, second correction units 620, third correction units 630, and fourth correction units 640. The first correction units 610 are arranged in a row at one side surface of the stage 500. The first correction units 610 apply a tension force to the flexible substrate 10 in the first direction.

The second correction units 620 are arranged in a row at another side surface of the stage 500. The second correction units 620 face the first correction units 610 with respect to the stage 500. The second correction units 620 apply a tension force to the flexible substrate 10 in the first direction.

The first and second correction units 610 and 620 may apply tension forces in the opposite directions. That is, when the first correction units 610 apply a tension force outwardly with respect to the flexible substrate 10, the second correction units 620 may apply a tension force outwardly with respect to the flexible substrate 10. Also, when the first correction units 610 apply a tension force inwardly with respect to the flexible substrate 10, the second correction units 620 may apply a tension force inwardly with respect to the flexible substrate 10.

The third correction units 630 are arranged in a row at another side surface of the stage 500. The third correction units 630 apply a tension force to the flexible substrate 10 in the second direction.

The fourth correction units 640 are arranged in a row at another side surface of the stage 500. The fourth correction units 640 apply a tension force to the flexible substrate 10 in the second direction. The stage 500 is arranged between the third and fourth correction units 630 and 640.

The third and fourth correction units 630 and 640 may apply tension forces in the opposite directions. That is, when the third correction units 630 apply a tension force outwardly with respect to the flexible substrate 10, the fourth correction units 640 may apply a tension force outwardly with respect to the flexible substrate 10. Also, when the third correction units 630 apply a tension force inwardly with respect to the flexible substrate 10, the fourth correction units 640 may apply a tension force inwardly with respect to the flexible substrate 10.

Also, the first correction units 610 may be integrally formed or coupled, or integrally driven. Likewise, each of the second, third, and fourth correction units 620, 630, and 640 may be integrally formed or coupled, or integrally driven.

In this case, the first, second, third, and fourth correction units 610, 620, 630, and 640 may be easily driven. Also, the distortion of a relatively simple structure such as symmetrical distortion may be easily corrected.

The support 700 supports the correction units 600 by surrounding the correction units 600. The correction units 600 are fixed at the inner side of the support 700.

The printing roller 800 is arranged above the flexible substrate 10. As the printing roller 800 roles on the flexible substrate 10, a pattern is formed. For example, the pattern is formed on the outer circumferential surface of the printing roller 800 and the pattern may be closely pressed against the flexible substrate 10.

Alternatively, an organic film for forming a pattern is formed on the upper surface of the flexible substrate 10 and, by applying a pressure to the organic film, the pattern may be formed on the flexible substrate 10.

Also, the printing roller 800 may employ a gravure, offset, or reverse offset method. Instead of the printing roller 800, an imprinting roller, a stamping unit, or a photolithography unit is used to form a pattern on the flexible substrate 10.

The process of forming a pattern on the flexible substrate 10 will now be described.

First, the unwinding roller 100 releases the flexible substrate 10 and the winding roller 200 winds the flexible substrate 10. Also, transfer roller 300 rotates. Accordingly, a portion of the flexible substrate 10 where a pattern is to be formed is transferred to the printing roller 800.

A vacuum pressure is applied to the second vacuum hole 602 and thus the correction units 600 is sucked and adheres to the lower surface of the flexible substrate 10. Then, the servo motor 603 is driven and thus a tension force is applied to the flexible substrate 10. The flexible substrate 10 is corrected. The correction units 600 are driven separately.

A vacuum pressure is applied to the first vacuum holes 510. The lower surface of the flexible substrate 10 is sucked and adheres to the stage 500.

The printing roller 800 forms a pattern on the flexible substrate 10. Then, the unwinding roller 100 releases the flexible substrate 10 and the winding roller 200 winds the flexible substrate 10. The transfer roller 300 rotates. The portion of the flexible substrate 10 where the pattern is formed is transferred from the printing roller 800 to the outside.

The flexible substrate 10 may be distorted due to heat, pressure, or chemicals. In particular, the flexible substrate 10 may be distorted not only in one direction but in a variety of methods of symmetric distortion, trapezoidal distortion, and non-symmetric distortion such as shear distortion and pincushion distortion.

The correction units 600 are driven separately to correct the flexible substrate 10. Thus, the correction units 600 may very precisely correct the flexible substrate 10. In particular, the non-symmetric distortion may be easily corrected by the correction units 600. Accordingly, the printing roller 800 may precisely form a pattern on the flexible substrate 10 so that misalign may be reduced.

Figure 4:
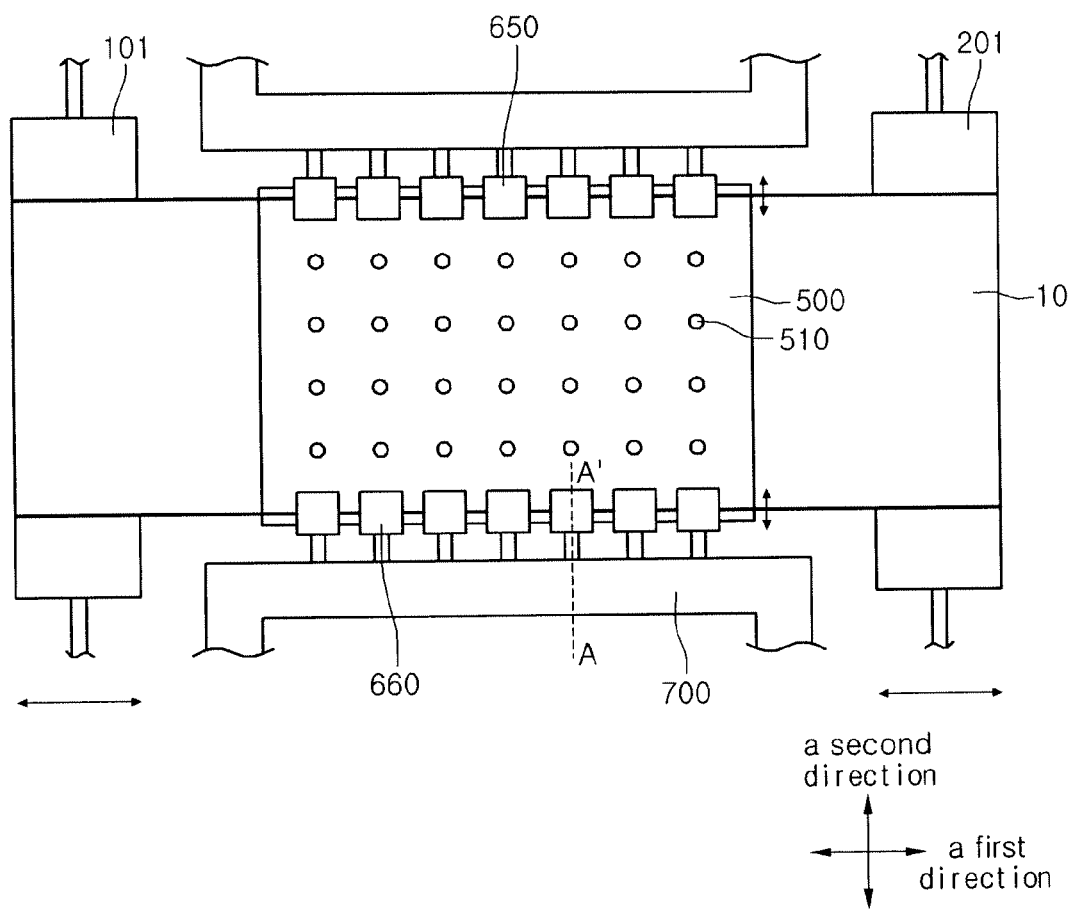
FIG. 4 illustrates a roll-to-roll system according to another embodiment of the present disclosure.
Figure 5:
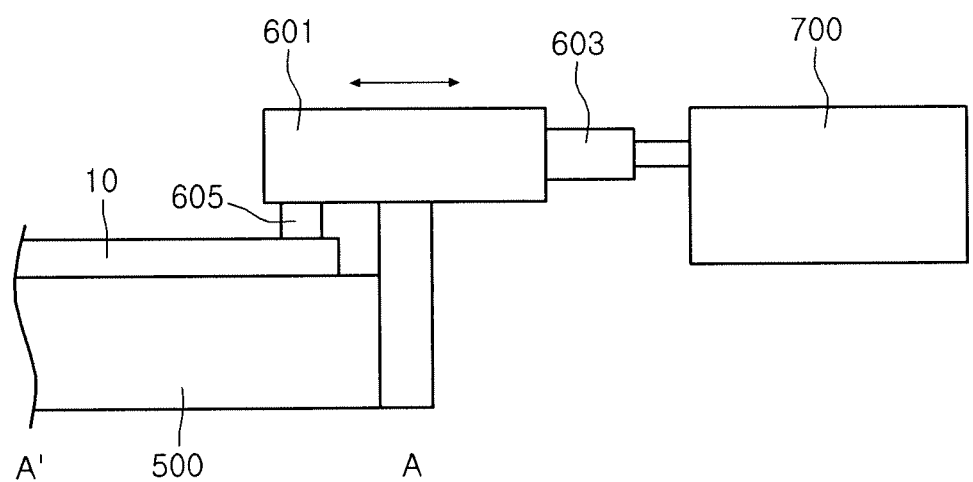
FIG. 5 is a cross-sectional view taken along the line A-A' of FIG. 4.

FIG. 4 illustrates a roll-to-roll system according to another embodiment of the present disclosure. FIG. 5 is a cross-sectional view taken along the line A-A' of FIG. 4. In the description of the present embodiment, referring to the descriptions about the above-described embodiment, the unwinding roller, the winding roller, and the correction units will be additionally described. The description about the above-described embodiment, except for the modified portions, may be substantially combined to the description about the present embodiment.

Referring to FIGS. 4 and 5, an unwinding roller 101 and a winding roller 201 apply tension forces to the flexible substrate 10. In detail, the unwinding roller 101 and the winding roller 201 apply tension forces to the flexible substrate 10. Thus, the distortion of the flexible substrate 10 in the second direction is corrected by the unwinding roller 101 and the winding roller 201.

Also, a tension force may be applied to the flexible substrate 10 by the transfer roller 300. The transfer roller 300 may correct the distortion of the flexible substrate 10 in the second direction. Correction units 650 and 660 are arranged on the stage 500. The correction units 650 and 660 are arranged linearly along the outer edge portions of the flexible substrate 10.

Referring to FIG. 5, each of the correction units 650 and 660 includes a gripper 605. The gripper 605 is fixed to the body 601 and applies a tension force to the flexible substrate 10 due to a frictional force. That is, the gripper 605 applies a tension force to the flexible substrate 10 in the first direction by the operation of the servo motor 603. Since the gripper 605 needs to finely fix and control the flexible substrate 10, the material and shape design of the gripper 605 is performed to have frictional properties.

The gripper 605 has elasticity and is formed of a material, for example, flexible resin. In detail, for example, polyurethane resin, rubber based resin, or polyester based resin may be used as a material for the gripper 605.

The correction units 650 and 660 may be classified into fifth correction units 650 and sixth correction units 660. The fifth correction units 650 are linearly arranged at one side of the flexible substrate 10. The sixth correction units 660 are linearly arranged at another side of the flexible substrate 10.

The fifth and sixth correction units 650 and 660 may apply tension forces to the flexible substrate 10 in the opposite directions. That is, when the fifth correction units 650 apply a tension force outwardly with respect to the flexible substrate 10, the sixth correction units 660 may apply a tension force outwardly with respect to the flexible substrate 10. Also, when the fifth correction units 650 apply a tension force inwardly with respect to the flexible substrate 10, the sixth correction units 660 may apply a tension force inwardly with respect to the flexible substrate 10.

Although the fifth correction units 650 may be separately driven, the fifth correction units 650 may be integrally formed or coupled, or integrally driven. Likewise, the sixth correction units may be integrally formed or coupled, or integrally driven.

As such, the unwinding roller 101, the winding roller 201, and the correction units 650 and 660 apply tension forces to the flexible substrate 10 so that the distortion of the flexible substrate 10 is corrected.

In a roll-to-toll system according to an embodiment of the present disclosure, while the winding roller 201 and the unwinding roller 101 are used to correct the distortion in the second direction, the correction units 650 and 660 are used to correct the distortion in the first direction.

In the roll-to-toll system according to the present embodiment, the distortion of the flexible substrate 10 may be efficiently corrected by using a less number of correction units.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A patterning apparatus comprising:
a stage disposed under a flexible substrate and having a plurality of first vacuum holes on a flat upper surface thereof;
a plurality of correction units being adjacent to the stage, being attached to the flexible substrate, and applying a tension force to the flexible substrate;
a pattern forming unit forming a pattern on the flexible substrate;
a first roller winding the flexible substrate;
a second roller releasing the flexible substrate,
wherein the first roller winds the flexible substrate in a first direction,
wherein the correction units are arranged along an entire perimeter of the stage, the correction units including a plurality of first correction units and a plurality of second correction units facing each other and applying a first tension force to the flexible substrate in a second direction substantially perpendicular to the first direction, and a plurality of third correction units and a plurality of fourth correction units facing each other and applying a second tension force to the flexible substrate in the first direction, and wherein the first tension force and the second tension force are different from each other, wherein each of the plurality of first to fourth correction units comprises:

a suction unit sucked on a lower surface of the flexible substrate;

a second vacuum hole formed in the suction unit;

a vacuum pump connected to the suction unit; and a motor driving the suction unit and applying an individually controllable tension force to correct a non-symmetric distortion of the flexible substrate, wherein the correction units are disposed under the flexible substrate, wherein the correction units are adhered to or separated from the lower surface of the flexible substrate by vacuum pressure through the second vacuum hole, and a support for the correction units, wherein the support is separate from the stage and surrounds the correction units, wherein the correction units are fixed at an inner side of the support, and wherein the motor of the correction units is fixed to the support, and the correction units are separately driven.

2. The patterning apparatus claimed as claim 1, wherein the correction units apply tension forces to the flexible substrate in the first direction.

3. The patterning apparatus claimed as claim 1, wherein the first roller and the second roller apply tension forces to the flexible substrate in the first direction.

4. The patterning apparatus claimed as claim 1, wherein the correction units comprise first correction units, second correction units, third correction units, fourth correction units, wherein the correction units are linearly disposed along outer-most edges of the stage, wherein the second correction units face the first correction units with respect to the stage, wherein the fourth correction units face the third correction units with respect to the stage.

* * * * *